(12) United States Patent
Pentico et al.

(10) Patent No.: US 7,347,561 B2
(45) Date of Patent: Mar. 25, 2008

(54) IMAGE DISPLAY DEVICE

(75) Inventors: Clark Pentico, Simi Valley, CA (US); Michael Newell, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 397 days.

(21) Appl. No.: 11/053,383

(22) Filed: Feb. 7, 2005

(65) Prior Publication Data

US 2006/0038961 A1    Feb. 23, 2006

Related U.S. Application Data

(63) Continuation-in-part of application No. 10/310,383, filed on Dec. 5, 2002, now Pat. No. 6,857,747, and a continuation-in-part of application No. 10/213,505, filed on Aug. 6, 2002, now Pat. No. 6,851,812.

(60) Provisional application No. 60/378,879, filed on May 8, 2002, provisional application No. 60/310,077, filed on Aug. 6, 2001.

(51) Int. Cl.
G03B 21/14 (2006.01)
(52) U.S. Cl. .............................. 353/31; 353/34; 349/8
(58) Field of Classification Search .................. 353/20, 353/31, 34, 33, 37; 349/5, 7, 8, 9
See application file for complete search history.

(56) References Cited

U.S. PATENT DOCUMENTS

| | | | |
|---|---|---|---|
| 3,637,308 A | 1/1972 | Van Raalte et al. | |
| 3,868,168 A | 2/1975 | De Veer | |
| 3,982,819 A | 9/1976 | Letellier | |
| 4,864,390 A | 9/1989 | McKechnie et al. | |
| 5,231,431 A | 7/1993 | Yano et al. | |
| 5,268,775 A | 12/1993 | Zeidler | |
| 5,295,009 A | 3/1994 | Barnik et al. | |
| 5,315,330 A | 5/1994 | Hamada | |
| 5,327,289 A | 7/1994 | Watanabe et al. | |
| 5,374,968 A | 12/1994 | Haven et al. | |
| 5,486,881 A | 1/1996 | Hwang | |
| 5,552,922 A | 9/1996 | Magarill | |

(Continued)

FOREIGN PATENT DOCUMENTS

| | | |
|---|---|---|
| EP | 0 658 794 A2 | 6/1995 |
| WO | WO 99/19758 | 4/1999 |
| WO | WO 00/63738 | 10/2000 |
| WO | WO 01/50178 | 7/2001 |
| WO | WO 01/72048 | 9/2001 |

*Primary Examiner*—William C. Dowling
(74) *Attorney, Agent, or Firm*—Allen, Dyer, Doppelt, Milbrath & Gilchrist, P.A.

(57) ABSTRACT

A color management system for use with projection displays includes, for example, two or more analyzers positioned to receive light beams as they are emitted from the panels of a color management system. The analyzers are positioned to receive the light beams directly from the image assimilators before the light has passed through another optical element such as a light combiner. The analyzers are configured for producing filtered light outputs with improved contrast relative to the incoming light beams. By positioning the analyzers to receive the light beams directly from the image assimilators, i.e., prior to passage through other optical elements, the analyzers are able to remove substantially all of the noise before it has become indistinguishable, on the basis of polarization, from the light that comprises the desirable image. Accordingly, this embodiment produces images having dramatically improved levels of contrast relative to prior art systems.

11 Claims, 6 Drawing Sheets

U.S. PATENT DOCUMENTS

| | | | |
|---|---|---|---|
| 5,562,334 A | 10/1996 | Wortel | |
| 5,621,486 A | 4/1997 | Doany et al. | |
| 5,658,060 A | 8/1997 | Dove | |
| 5,701,203 A | 12/1997 | Watanabe | |
| 5,917,561 A | 6/1999 | Hatanaka | |
| 5,946,114 A | 8/1999 | Loiseaux et al. | |
| 5,973,759 A * | 10/1999 | Itoh et al. | 349/5 |
| 6,120,153 A | 9/2000 | Ohta | |
| 6,176,585 B1 | 1/2001 | Koyama et al. | |
| 6,176,586 B1 | 1/2001 | Hirose et al. | |
| 6,183,090 B1 | 2/2001 | Nakanishi et al. | |
| 6,183,091 B1 | 2/2001 | Johnson et al. | |
| 6,231,190 B1 | 5/2001 | Dewald | |
| 6,234,634 B1 | 5/2001 | Hansen et al. | |
| 6,273,568 B1 | 8/2001 | Okuyama | |
| 6,309,071 B1 | 10/2001 | Huang et al. | |
| 6,384,972 B1 | 5/2002 | Chuang | |
| 6,419,362 B1 | 7/2002 | Ikeda et al. | |
| 6,454,416 B2 | 9/2002 | Aoto et al. | |
| 6,457,831 B1 | 10/2002 | Chuang et al. | |
| 6,490,087 B1 | 12/2002 | Fulkerson et al. | |
| 6,513,934 B1 | 2/2003 | Okuyama | |
| 6,545,804 B2 | 4/2003 | Chuang | |
| 6,585,378 B2 | 7/2003 | Kurtz et al. | |
| 6,601,957 B2 | 8/2003 | Sugawara | |
| 6,624,862 B1 | 9/2003 | Hayashi et al. | |
| 6,626,540 B2 | 9/2003 | Ouchi et al. | |
| 6,661,475 B1 | 12/2003 | Stahl et al. | |
| 6,678,015 B2 | 1/2004 | Yi et al. | |
| 6,685,322 B2 | 2/2004 | Sawamura et al. | |
| 6,910,773 B2 * | 6/2005 | Nakashima et al. | 353/20 |
| 7,172,287 B2 * | 2/2007 | Kang | 353/20 |
| 2002/0105602 A1 | 8/2002 | Pan | |
| 2005/0024591 A1* | 2/2005 | Lian et al. | 353/20 |
| 2006/0044515 A1* | 3/2006 | Suzuki | 353/20 |
| 2006/0066811 A1* | 3/2006 | Sato et al. | 353/20 |
| 2006/0119797 A1* | 6/2006 | Ockenfuss | 353/31 |
| 2006/0126020 A1* | 6/2006 | Hirata et al. | 353/20 |

* cited by examiner

IMAGE DISPLAY DEVICE

CROSS REFERENCE TO RELATED APPLICATIONS

This application is a continuation-in-part of and claims benefit of priority from U.S. patent application Ser. No. 10/310,383, filed Dec. 5, 2002 now U.S. Pat. No. 6,857,747. This application claims benefit of priority from U.S. Provisional Patent Application Ser. No. 60/378,879, filed May 8, 2002, which is hereby incorporated by reference. This application is also a continuation-in-part of and claims benefit of priority from U.S. nonprovisional patent application Ser. No. 10/213,505, filed Aug. 6, 2002 now U.S. Pat. No. 6,851,812, which claims benefit of priority from U.S. Provisional Patent Application Ser. No. 60/310,077, filed Aug. 6, 2001, both of which are hereby incorporated by reference.

FIELD OF THE INVENTION

The present invention relates generally to color management systems for projection displays, and more specifically to systems and methods for separating input illumination into separate color channels, superimposing spatial information on each of the separate channels, eliminating unwanted noise, and recombining the separate color channels to facilitate projection of a high-contrast, full color image.

BACKGROUND OF THE INVENTION

In conjunction with a projection display, it is desirable to employ a color management system, and it is further desirable that such color management system facilitate the production of a high contrast image while accommodating a relatively high level of illuminating flux and providing for efficient packaging. Unfortunately, currently existing color management systems are capable of achieving increased contrast at practical levels of illuminating flux only by employing highly specialized materials, resulting in unreasonable increases in cost.

A color management system typically functions by first separating input light (e.g., white light) into a plurality of color channels traversing the visible spectrum (e.g. red, green and blue), then using the separate color channels to illuminate a plurality of corresponding microdisplays (e.g., liquid crystal on silicon (LCoS) microdisplays) and recombining the color channels to produce an output light (e.g., white light). Where it is desired to project an image in conjunction with the output light beam, spatial information may be superimposed into each of the color channels by the microdisplays prior to recombination. As a result, a full color image may be projected in conjunction with the output light beam. As used herein, the terms "microdisplay," "panel," "display," "display panel," and "light valve" refer to a mechanism configured for receiving an incipient light beam, imparting spatial information in the light beam, and emitting a modified light beam comprising the incipient light beam and the spatial information. An example of such a microdisplay is model number DILA SX-070 manufactured by the JVC company of Japan.

Prior art color management systems have thus far not sufficiently proven to be able to produce high contrast images at low cost without compromising their ability to maintain reasonable quantities of illuminating flux or to be packaged efficiently. This is due, in part, to image noise caused by optical characteristics that are inherent in all real optical elements. This is also due to the inability of currently existing color management systems to effectively separate and remove such noise from the light beam before it is projected to a display.

For example, many prior art color management systems use solid "cube-type" polarizing beamsplitters for color separation and recombination. These polarizing beamsplitters are otherwise referred to as MacNeille prisms or cube polarizing beamsplitters. "Cube type" polarizing beamsplitters are inherently susceptible to thermal gradients that typically arise at high flux levels, often causing stress birefringence which results in depolarization of the light and a loss of contrast. As a result, where high contrast images are desired, it has been necessary to use costly high-index, low-birefringence glass. Although this solution has proven effective to reduce birefringence at low levels of flux, it is expensive and exhibits reduced effectiveness at eliminating thermally induced birefringence at high flux levels (e.g., greater than approximately 500 lumens).

For example, FIG. 1 illustrates a prior art color management system 110, commonly known as the ColorQuad™ from Colorlink, in which four cube polarizing beanmsplitters and five color selective retardation elements are used to provide color separation and recombination. In accordance with this system, the input cubic polarizing beamsplitter receives an input light beam 120 and separates it into three components: a green component 121, a blue component 122, and a red component 123. The red component 123 receives spatial information from a red panel 133, the blue component 122 receives spatial information from a blue panel 132, and the green component 121 receives spatial information from a green panel 131. Finally, the output cubic polarizing beamsplitter recombines the red component 123 and the blue component 122 with the green component 121 to form a full color image 140.

It should be noted that at high levels of light flux, color management system 110 typically becomes thermally loaded and necessarily distorts physically, causing stress birefringence, which often results in depolarization of the light and a decrease in contrast. Further, in addition to receiving spatial information from the red, green and blue panels in the color management system 110, the red, green, and blue light components also typically receive undesirable spatial information as a result of birefringence in the materials of the optical components in the red, green, and blue light paths. This undesirable spatial information tends to further decrease the contrast of the image.

In an attempt to reduce the adverse effects of the use of cube polarizing beamsplitters, various attempts have been made to implement plate polarizing beamsplitters in place of cube configurations in color management systems. However, these attempts have often given rise to other optical aberrations associated with the plate polarizing beamsplitters, such as astigmatism. Thus, it is well understood that most if not all optical elements used in today's color management systems contribute noise to, and/or otherwise corrupt, any light beam passing through, or affected by, the optical element. It should be noted that, as used herein, the terms "noise" and/or "corrupt[ion of a] light beam" refer to optical effects associated with, and/or comprising, for example, scatter, polarization rotation (e.g., non-homogenously polarized light emitted from a polarizing beamsplitter that may comprise components having undesirably rotated polarization orientations), material birefringence, and or other undesirable characteristics associated with geometries and/or coatings of optical elements, and the like.

Accordingly, many color management systems also include optical filters, such as analyzers or polarizers that are configured to attempt to eliminate most or all of such noise from the light beam so that a substantial portion of the contrast of the image might be restored. These filters may attempt to eliminate such noise, for example, by separating light according to its polarization. This is made possible by the fact that the desirable light components of the light beam may be oriented with a first polarization while the noise may be oriented differently or otherwise not polarized.

Unfortunately, however, as a light beam passes through, or is affected by, an optical element, the polarization of the light tends to be disturbed. Thus, a portion of the noise often becomes indistinguishable, on the basis of polarization at least, from the light that comprises the desirable image. Accordingly, the opportunity to fully and effectively eliminate noise from the light beam on the basis of polarization diminishes as the tainted light beam passes through, or is affected by, each successive optical element. Nevertheless, in prior art systems, the additional light constituents are not removed until after the corrupted light beam has passed through, or has been affected by, additional optical elements, such as a light recombiner, a prism, and/or the like.

Accordingly, it would be advantageous to have a color management system that could be used in high flux projection systems while simultaneously functioning in a wide range of thermal environments with reduced birefringence sensitivity and improved durability while producing a high-contrast image. It would further be advantageous to have a color management system that could achieve these objectives without requiring costly, high index, low birefringence glass or a particular susceptibility to optical aberrations produced by polarizing beamsplitters in plate configurations.

SUMMARY OF THE INVENTION

The methods and apparatus of the present invention address many of the shortcomings of the prior art. In accordance with various aspects of the present invention, improved methods and apparatus facilitate color management for projection display systems. The effective color management of the present invention is suitable for use in high flux projection systems with improved contrast, birefringence sensitivity and durability, while significantly reducing cost. In addition, the present invention provides color management suitable for use in adverse thermal environments without requiring costly, high index, low birefringence glass.

In accordance with an exemplary embodiment of the present invention, a color management system includes two or more analyzers positioned to receive light beams as they are emitted from the panels of a color management system. The analyzers are positioned to receive the light beams directly from the image assimilators before the light has passed through another optical element such as, for example, a light combiner. The analyzers are configured for producing filtered light outputs with improved contrast relative to the incoming light beams. By positioning the analyzers to receive the light beams directly from the image assimilators, i.e., prior to passage through other optical elements, the analyzers are able to remove substantially all of the noise before the noise has become indistinguishable, on the basis of polarization, from the light that comprises the desirable image. Accordingly, this embodiment produces images having dramatically improved levels of contrast and dark state uniformity relative to prior art systems.

In accordance with another exemplary embodiment of the present invention, each analyzer and/or image assimilator may also include a filter (e.g., an optical retarder element, such as a half-wave retarder or a quarter-wave retarder). Where the filter comprises an optical retarder element, the retarder element may be configured to selectively modify the polarization of the light emerging from the image assimilator (e.g., a panel) so that the emerging light is substantially linearly polarized and further so that the polarization axis for each color band is substantially the same as that of each other color band. It should be noted that such filters may be selected to exhibit a specific optical retardance, for example, between about 15 nanometers and about 350 nanometers of optical retardance, depending upon the extent to which rotation is desired to match the residual retardance in the image assimilator, e.g., to substantially compensate for the optical retardence of the panel. Optionally, depending on the characteristics of the optical retardation element, the analyzer may be configured to remove light of a predetermined wavelength, or band of wavelengths, from the light output.

In an exemplary embodiment, a color management system comprises two or more panels, each receiving and emitting a separate light component. In accordance with this embodiment, the separate light components may have originated from a light source, from which a light beam was received by one or more light separators. Each such light separator is positioned to receive a light input comprising two or more components, and each of such light separators is configured for separating the components from one another and emitting two or more light beams, each comprising one or more of the components.

In an exemplary embodiment, a color management system may further comprise a third panel for receiving and emitting a third light component. In this embodiment, an additional light separator is positioned to receive one or more of the light beams from a first light separator, and the additional light separator is configured to further separate the light emitted by the first light separator into two additional components. Each light separator may comprise a wire grid polarizer, a dichroic beamsplitter, an optical retarder, a dichroic prism coupled with an optical retarder, a plate dichroic beamsplitter, and/or a polarizing beamsplitter, which may further comprise a wire grid polarizer. Each light separator may be configured for producing a red light output, a green light output, a blue light output, or a cyan light output comprising green light and blue light.

In an exemplary embodiment, a color management system may comprise one or more image assimilator, each being associated with a light component. Each such image assimilator may comprise a reflective spatial light modulator configured to modify the polarization of the incoming light beam in a predetermined manner and to superimpose spatial information on the light beam so as to produce a light beam that comprises spatial information. Each such image assimilator is configured for substantially transmitting an incoming light beam to be received by a display panel, to receive a modified light beam from the display panel, and to emit the modified light beam to be received directly by an analyzer. In addition to a spatial light modulator, each image assimilator may comprise a wire grid polarizer, a plate dichroic beamsplitter, an optical retarder, a dichroic prism coupled with an optical retarder, and/or a polarizing beamsplitter which may further comprise a wire grid polarizer.

In an exemplary embodiment, a color management system also includes a light combiner positioned to receive the filtered light beams emitted from the analyzers. The light combiner is configured to combine the filtered light outputs to produce a single filtered light output. The light combiner may comprise a dichroic beamsplitter, a polarizing beamsplitter and/or an x-prism. If the light combiner is an x-prism, it may include one or more dichroic filters and may also include a polarizing beamsplitter. Finally, the color management system may include a projection lens for projecting an output light beam containing spatial information for projecting an image.

In accordance with an exemplary embodiment of the present invention a method for facilitating color management for a projection system is provided comprising receiving two or more input light beams having spatial information and noise directly from associated image assimilators, separating the noise from the spatial information in each of the light beams, and emitting filtered light outputs comprising the spatial information, whereby the output light beams have an improved contrast relative to the light beams.

As used herein, the term "component" refers to a portion of a light transmission. For example, where a light transmission contains light of various wavelengths in the visible spectrum (e.g., red, blue, and green), the light transmission may be separated into a plurality of components, each corresponding to a range of wavelengths (i.e., color bands), such as red, blue, or green, in the visible spectrum. As a further example, a light transmission may comprise polarized light oriented in one or more planes.

Accordingly, the use of closely-coupled analyzers positioned to receive light beams directly from associated image assimilators enables the color management system to effectively eliminate a substantial portion of noise imparted on the light beam by each of the image assimilators and to produce output beams having superior contrast relative to the prior art. Moreover, the present invention may employ both polarization dependent elements and dichroic elements to split an input light into a plurality of color bands upon which spatial information may be superimposed by a corresponding plurality of microdisplays, the modified color bands being recombined to produce a high-contrast, full color projected image.

BRIEF DESCRIPTION OF THE DRAWINGS

The above-mentioned objects and features of the present invention can be more clearly understood from the following detailed description considered in conjunction with the following drawings, in which like numerals represent like elements and in which.

DETAILED DESCRIPTION

Figure 1:
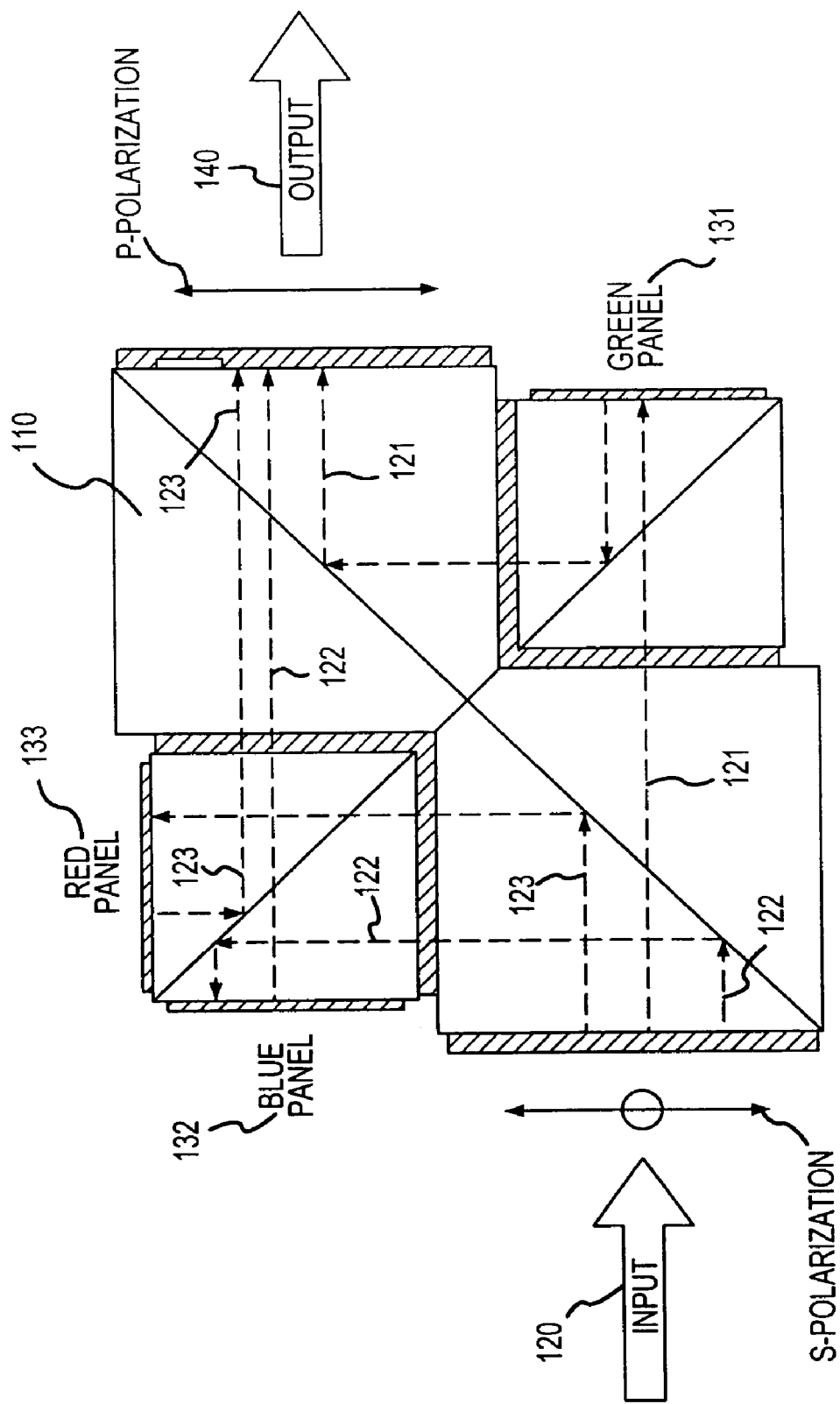
FIG. 1 illustrates a prior art color management system.

The present invention may be described herein in terms of various functional elements and/or various processing steps. It should be appreciated that such functional elements may be realized by any number of software, hardware, electrical, optical and/or structural elements configured to perform the specified functions. For example, the present invention may employ various optical and/or digital electrical elements, whose values may be suitably configured for various intended purposes. In addition, the present invention may be practiced in any optical application. However, for purposes of illustration only, exemplary embodiments of the present invention will be described herein in connection with projection displays. Further, it should be noted that while various elements may be suitably coupled or connected to other elements within exemplary optical systems, such connections and couplings can be realized by direct connection between elements, or by connection through other elements and devices located therein between.

As discussed above, prior art color management systems suffer from shortcomings such as limitation in light intensity, high cost, poor image contrast, excessive birefringence sensitivity, and lack of durability. Prior art attempts to overcome these shortcomings have involved the use of costly high-index, low-birefringence glass. Yet, despite the use of these expensive materials, poor image contrast, and thermally induced birefringence remain problems at light intensity levels greater than approximately 500 lumens.

In accordance with various aspects of the present invention, an improved color management system is provided that improves image contrast and facilitates color management suitable for use in adverse thermal environments without requiring costly, high index, low birefringence glass. The present invention includes any suitable system or method for closely coupling analyzers to image assimilators. The present invention also includes any suitable system or method for the analyzers to receive light beams directly from the image assimilators, and in certain embodiments, analyzers receiving two or more light beams directly from image assimilators. In accordance with an exemplary embodiment of the present invention, input illumination light is split into a plurality of different color bands and then recombined after superimposition of spatial information by a corresponding plurality of microdisplays and reduction of noise as provided by corresponding filters, thereby producing a substantially full-color, high-contrast image. As a result, effective color management of the present invention is suitable for use in high lumen projection systems with reduced cost, improved contrast, reduced birefringence sensitivity, improved dark state uniformity, and improved durability. In addition, the present invention provides color management suitable for use in adverse thermal environments without requiring costly, high index, low birefringence glass.

Figure 2:
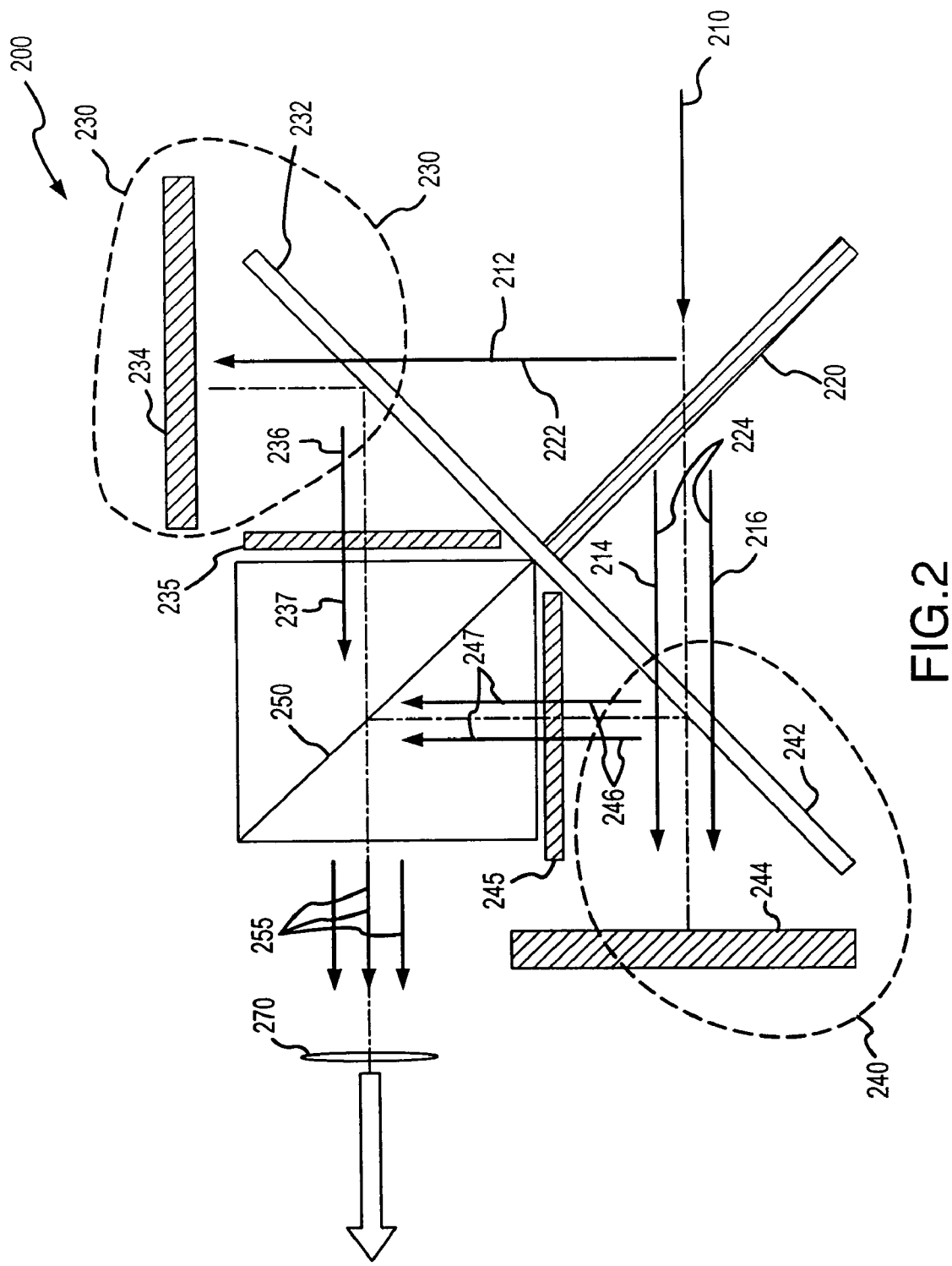
FIG. 2 illustrates a color management system in accordance with an exemplary embodiment of the present invention.

In one embodiment, with reference to FIG. 2, an exemplary color management system 200 includes a light separator 220, a first image assimilator 230, a second image assimilator 240, a first analyzer 235, a second analyzer 245, and a light combiner 250. The light separator 220 may receive a light beam 210 from a source, separate the light beam 210 into two or more components 212, 214, 216, and emit two or more light beams 222, 224, each having one or more of the components. For example, as shown in FIG. 2, the light separator 220 is positioned to receive an input light 210 having a first component and a second component. The light separator 220 is configured to separate the first component from the second component and configured to emit a first light beam 222 comprising the first component 212 and a second light beam 224 comprising the second component 214 and a third component 216. The light separator 220 may include a polarizing beamsplitter configured to separate light oriented in a first plane from light oriented in a second plane. The light separator 220 may emit or transmit a first light beam 222 comprising light oriented in the first plane 212 and a second light beam 224 comprising light oriented in the second plane 214.

The light separator 220 may include a wire grid polarizer, a dichroic mirror, a dichroic beamsplitter, an optical retarder, a dichroic prism coupled with an optical retarder, a plate dichroic beamsplitter, a plate polarizing beamsplitter or a polarizing beamsplitter, which may further include a wire grid polarizer. The light separator 220 may be configured to produce a red light output, a green light output, a blue light output, and/or a cyan light output comprising green light and blue light. The light separator 220 may be a dichroic plate beamsplitter configured to receive a modulated input light beam 210 and to emit two output light beams 222, 224. In one embodiment, the first output light beam 222 may include a red component 212 and the second output light beam 224 may include a blue component 214 and a green component 216.

The light separator 220 may be configured to produce light where color images are generated by temporally modulating the color of the light into separate spectral bands, which can include red, green and blue, or any other combination that could be recombined to produce a desired output, such as a white light output. The light separator 220 may be a polarizing plate beamsplitter configured to receive a modulated input light beam 210 and emit two output light beams 222, 224. The first output light beam 222 may include a polarized light component 212. Second output light beam 224 may include a polarized light component 214, which is substantially orthogonal to the polarized light component 212 of the first output light beam 222.

In one embodiment, the light separator 220 can be a device (e.g., a polarizing beamsplitter) configured to separate an input light beam 210 into two emergent linearly polarized light beams 222, 224. The polarizing beamsplitter 220 may include a dichroic mirror having a coating configured to separate the input light beam 210 into components 212, 214 of different colors. For example, a typical coating may be a thin film dielectric coating. In another embodiment, the polarizing beamsplitter 220 may be a dielectric beamsplitter having a coating configured to separate light into different components 212, 214 based upon, for example, color or polarization.

In one embodiment, the polarizing beamsplitter 220 is configured to separate polarized light oriented in a first plane from polarized light oriented in a second plane. In an exemplary embodiment, the polarizing beamsplitter 220 may be configured to emit in a first direction the polarized light oriented in the first plane 212 and to emit in a second direction the polarized light oriented in the second plane 214, where the second direction is substantially orthogonal to the first direction. In another exemplary embodiment, the polarizing beamsplitter 220 may be configured, as shown in FIG. 2, to substantially transmit the polarized light oriented in the second plane 214 and to substantially reflect the polarized light oriented in the first plane 212. In another embodiment, the polarizing beamsplitter 220 may be configured to substantially reflect the polarized light oriented in the second plane 214 and to substantially transmit the polarized light oriented in the first plane 212. In one embodiment, the polarizing beamsplitter 220 may include a pair of polarizing beamsplitters having their active surfaces facing substantially away from one another, or a single polarizing beamsplitter element with active surfaces on both sides.

In one embodiment, a plurality of fold mirrors may be employed to direct the various light beams between the elements of the color management system. As used herein, a fold mirror refers to any reflective surface capable of reflecting light. For example, a fold mirror may be an aluminized mirror or an enhanced silver mirror, such as the Siflex mirror produced by Unaxis company of Liechtenstein.

The first image assimilator 230 may include a first polarizing beamsplitter 232 and a first microdisplay 234 and may be positioned to receive the first output light beam 222. The second image assimilator 240 may include a second polarizing beamsplitter 242 and a second microdisplay 244 and may be positioned to receive the second output light beam 224. Each image assimilators 230, 240 may include a reflective spatial light modulator 234, 244 configured to modify the polarization of the incoming light beam in a predetermined manner and superimpose spatial information on the light beam so as to produce a light beam that includes spatial information. Each image assimilator 230, 240 (e.g., each beamsplitter 232, 242) may be configured to substantially transmit an incoming light beam to be received by a display panel 234, 244, receive a modified light beam from the display panel 234, 244, and emit or reflect the modified light beam 236, 246 to be received directly by the analyzer 235, 245. Each image assimilator 230, 240 may include a wire grid polarizer, a dichroic mirror, a plate dichroic beamsplitter, an optical retarder, a dichroic prism coupled with or without an optical retarder, or a polarizing beamsplitter which may further include a wire grid polarizer.

In one embodiment, the first image assimilator 230 receives a first output light beam 222, rotates its polarization orientation, imparts first spatial information on it, and emits a first modified light beam 236 including first spatial information and noise. The second image assimilator 240 receives a second output light beam 224, rotates its polarization orientation, imparts second spatial information on it, and emits a second modified light beam 246 including second spatial information and noise. The first and second spatial information may include polarized light.

In one embodiment, the image assimilators 230, 240 may include a dichroic prism. In an alternative embodiment, the image assimilator 230, 240 may be a substantially equal path length prism. In another exemplary embodiment, the image assimilator 230, 240 may include a polarizing filter for producing a differentiated light output including the second component 214 and the third component 216, where the orientation of the second component 214 is rotated to be orthogonal to the orientation of the third component 216. In accordance with this alternative embodiment, the image assimilator 230, 240 further includes a second polarizing beamsplitter 242 positioned to receive from the polarizing filter the differentiated light output. The second polarizing beamsplitter 242 is configured to separate the second component 214 from the third component 216 before substantially transmitting the second component 214 to be received by the second microdisplay 244 and before substantially transmitting the third component 216 to be received by a third microdisplay.

Accordingly, in an exemplary embodiment, the contrast of the image may be enhanced by the analyzers 235, 245 positioned to receive the modified light outputs from the image assimilators 230, 240 and to further modify the light to produce polarized light oriented in a single plane (i.e., substantially linearly polarized light) which may be accomplished by rotating the polarization axis of one or more of the light beams. In yet another exemplary embodiment, the analyzer 235, 245 may be configured to remove light of a predetermined wavelength from the light beam, depending on the characteristics of the filters (i.e., the color selective retardation elements).

As used herein, the terms "filter" and "analyzer" refer to one or more optical filters, and combinations of one or more optical elements, configured to discriminate (i.e., block, permit to pass, and/or alter the polarization properties of light flux based on physical characteristics of the light, such as wavelength, orientation, polarization, flash and/or field rate) and may be constructed using any technique known in the art such as, for example, embedding an optically active material such as a spectrally sensitive optical retardation film in or on an otherwise transparent substrate or placing a plurality of very thin wires in parallel orientation to one another leaving thin gaps through which light may pass to produce polarized light. Examples of filters configured for discriminating light based upon its physical characteristics include dichroic plates manufactured by OCLI of Santa Rosa, Calif. and Unaxis of Liechtenstein, ColorSelect filters manufactured by ColorLink of Boulder, Colo., absorptive sheet polarizers manufactured by Polaroid, ProFlux polarizers, and polarizing beamsplitters manufactured by Moxtek of Orem, Utah.

The first analyzer 235 is positioned to receive the first modified light output 236 directly from the first image assimilator 230 and is configured to separate first spatial information from noise based on polarization. The first analyzer 235 is configured to substantially transmit the first spatial information and to prevent or minimize transmission of noise, which includes substantially non-polarized light or polarized light that is not oriented in the same manner as the desired spatial information. Similarly, the second analyzer 245 is positioned to receive the second modified light output 246 directly from the second image assimilator 240 and is configured to substantially separate second spatial information from noise based on polarization. The second analyzer 245 is configured to substantially transmit the second spatial information and to prevent or minimize transmission of noise, which includes substantially non-polarized light or polarized light that is not oriented in the same manner as the desired spatial information. Because the first and second analyzers 235, 245 are positioned to receive the first modified light output 236 and the second modified light output 246 directly from the first and second image assimilators 230, 240, prior to modification by any other optical elements, the first and second analyzers 235, 245 are capable of eliminating or minimizing substantially all of the noise imparted onto the first and second modified light output 236, 246 by the image assimilators 230, 240.

The analyzers 235, 245 are positioned to receive the light beams directly from the image assimilators 230, 240 before the light has passed through another optical element such as a light combiner 250. The analyzers 235, 245 are generally configured to produce filtered light outputs with improved contrast relative to the incoming light beams. By positioning the analyzers 235, 245 to receive the light beams directly from the image assimilators 230, 240, i.e., prior to passage through or modification by other optical elements, the analyzers 235, 245 are able to remove substantially all of the noise before the noise becomes indistinguishable, on the basis of polarization, from the light that includes the desirable image. Accordingly, this embodiment produces images having dramatically improved levels of contrast relative to prior art systems.

In accordance with another exemplary embodiment, each analyzer 235, 245 may also include a filter (e.g., an optical retarder element, such as a half-wave retarder or a quarter-wave retarder). Where the filter is an optical retarder element, the retarder element may be configured to selectively modify the polarization of the light emerging from the image assimilator so that the emerging light is substantially linearly polarized and further so that the polarization axis for each color band is substantially the same as that of each other color band. Such filters may be selected to exhibit a specific optical retardance, for example, between about 15 nanometers and 350 nanometers of optical retardance, depending upon the extent to which rotation is desired to match the residual retardance in the image assimilator, e.g., to substantially compensate for the optical retardance of the panel. Optionally, depending on the characteristics of the optical retardation element, the analyzer 235, 245 may remove light of a predetermined wavelength, or band of wavelengths, from the light beam 236, 246.

In an exemplary embodiment, the color management system may include a light combiner 250 positioned to receive the filtered light beams 237, 247 emitted from the analyzers 235, 245. The light combiner 250 is configured to substantially combine the filtered light beams 237, 247 to produce a single filtered light output 255. The light combiner 250 may form a comprehensive light output 255 from the individual light outputs 237, 247. In an exemplary embodiment, the light combiner 250 includes a polarizing beamsplitter, which may be the same element, and serve the substantially same function, as the light separator 220. The light combiner 250 may include a dichroic beamsplitter or an x-prism. Where the light combiner 250 is an x-prism, it may include one or more dichroic filters and may also include a polarizing beamsplitter.

The x-prism may be an optical element having two planes that lie substantially orthogonal to one another. In an exemplary x-prism, a first plane is a dichroic filter configured to substantially transmit light having a first wavelength and to substantially reflect light having a second wavelength. In such an exemplary x-prism, a second plane, lying substantially orthogonal to the first plane, has a dichroic filter configured to substantially reflect light having the first wavelength and to substantially transmit light having the second wavelength. In another exemplary x-prism, a first plane is a dichroic filter configured to substantially transmit light having the first wavelength and to substantially reflect light having the second wavelength. In this exemplary x-prism, a second plane, lying substantially orthogonal to the first plane, has a polarizing beamsplitter configured to substantially reflect light oriented with a first polarization and to substantially transmit light oriented with a second polarization.

In an exemplary embodiment, the first output light beam 222 is directed substantially perpendicular to the second output light beam 224. The first polarizing beamsplitter 232 and the second polarizing beamsplitter 242 may include the same polarizing beamsplitter oriented so as to receive both the first output light beam 222 and the second output light beam 224 at a substantially 45 degree angle from the surface of the polarizing beamsplitter 232, 242. In accordance with this embodiment, the polarizing beamsplitters 232, 242 are configured to substantially transmit the first output light beam 222 to be received by the first microdisplay 234 and to substantially transmit the second output light beam 224 to be received by the second microdisplay 244. The polarizing beamsplitters 232, 242 are also positioned to receive the modified first and second light beams 236, 246 at a substantially 45 degree angle. Because the polarization of the modified light beams 236, 246 are rotated from the orientation of light beams 222, 224, however, the polarizing beamsplitters 232, 242 are configured to substantially reflect the modified light beams 236, 246. In one embodiment, the modified light beams 236, 246 are reflected toward the analyzers 235, 245. In one embodiment, the modified light beams 236, 246 may be directed directly toward the light combiner 250. The ability to use a single polarizing beamsplitter 232, 242 and to direct the modified light beams 236, 246 directly toward the light combiner 250, without the use of other elements to redirect the light beams, significantly reduces cost, complexity, and size relative to other color management systems. Finally, the color management system may include a projection lens 270 for projecting the output light beam 255 containing spatial information for projecting an image.

Figure 4:
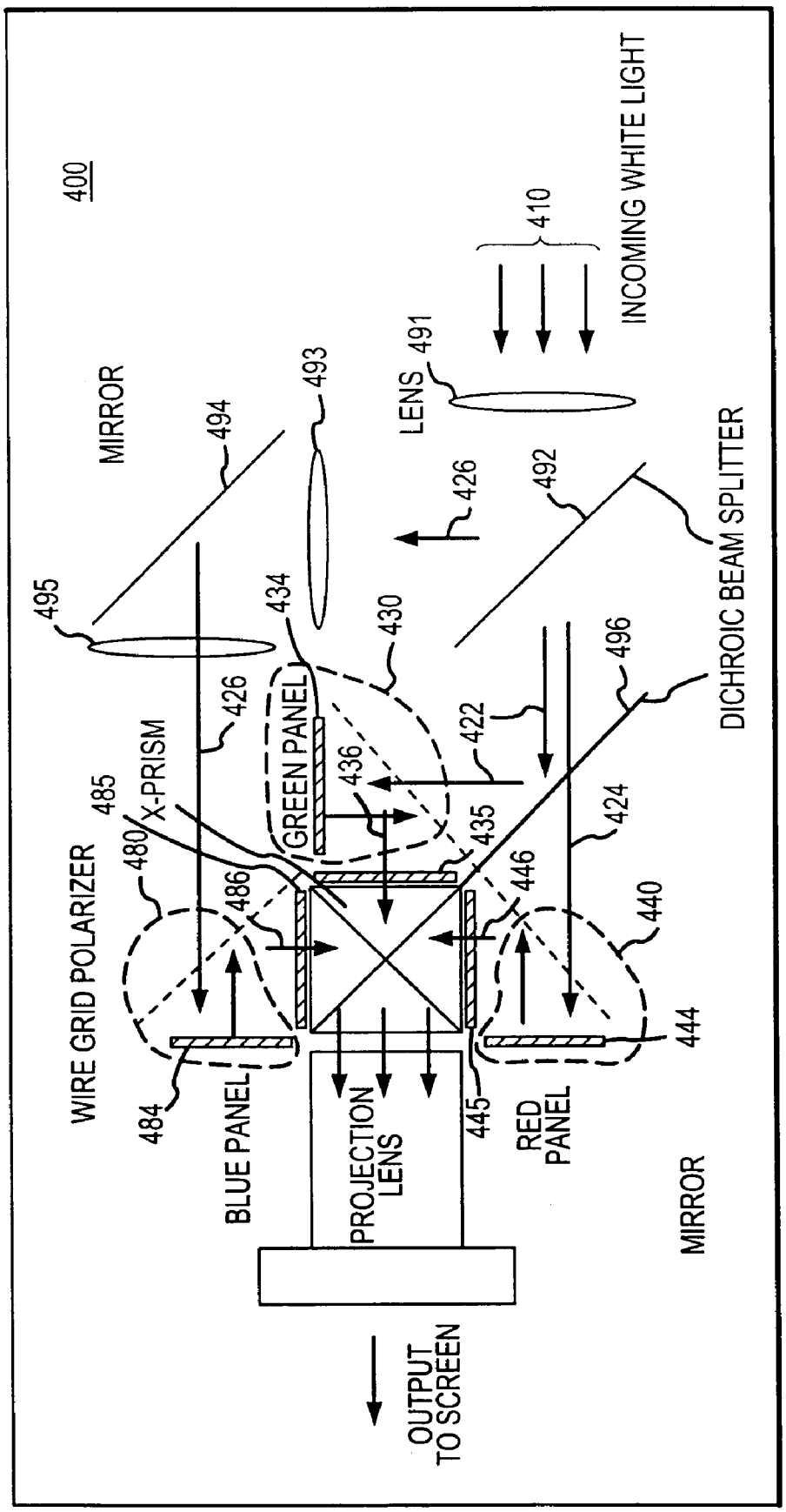
FIG. 4 illustrates a color management system in accordance with an exemplary embodiment of the present invention.

In an exemplary embodiment, as shown in FIG. 4, a color management system 400 may include a third image assimilator 480 in addition to a first image assimilator 430 and a second image assimilator 440. In accordance with this embodiment, the first image assimilator 430, which includes a green microdisplay or panel 434, is positioned to receive a first light beam 422. The second image assimilator 440, which includes a red microdisplay or panel 444, is positioned to receive a second light beam 424. The third image assimilator 480, which includes a blue microdisplay or panel 484, is positioned to receive a third light beam 426. Each image assimilator 430, 440, 480 is configured to modify the polarization of the incoming light beam in a predetermined manner and to superimpose spatial information on the light beam so as to produce a light beam that includes spatial information. Each image assimilator 430, 440, 480 is configured to substantially transmit an incoming light beam to be received by a microdisplay 434, 444, 484, to receive a modified light beam 436, 446, 486 from the microdisplay 434, 444, 484, and to emit the modified light beam 436, 446, 486 to be received directly by an analyzer 435, 445, 485.

In accordance with an exemplary embodiment, the first image assimilator 430 receives a first light beam 422, rotates its polarization orientation, imparts first spatial information on it, and emits a first modified light beam 436 including first spatial information and noise. The second image assimilator 440 receives a second light beam 424, rotates its polarization orientation, imparts second spatial information on it, and emits a second modified light beam 446 including second spatial information and noise. The third image assimilator 480 receives a third light beam 426, rotates its polarization orientation, imparts third spatial information on it, and emits a third modified light beam 486 comprising third spatial information and noise. In accordance with this embodiment, the first, second, and third spatial information comprise polarized light.

Accordingly, in this exemplary embodiment, the contrast of the image may be enhanced by the analyzers 435, 445, 485 positioned to receive the modified light beams from the image assimilators 430, 440, 480 and to further modify the light to produce polarized light oriented in a single plane (i.e., substantially linearly polarized light) which may be accomplished by rotating the polarization axis of one or more of the light beams. Also, as mentioned in connection with the description of another exemplary embodiment, analyzers 435, 445, 485 may be configured for removing light of a predetermined wavelength from the light beam, depending on the characteristics of the filters (i.e., the color selective retardation elements).

As one skilled in the art will appreciate, a variety of configurations may be constructed to effectively separate an input light beam including white light into a plurality of component light beams, upon which spatial information may be imparted, and from which noise may be effectively separated and removed by passing such modified component light beams from the image assimilators to be directly received by a plurality of corresponding analyzers. Such configurations may include a combination of polarizing beamsplitters, mirrors, and/or field lenses arranged to separate input light into component light beams and to direct those component light beams so that they may be received by associated image assimilators. For example, as shown in FIG. 4, in an exemplary embodiment, an input light beam 410 may be received by a first lens 491, which transmits a light beam to be received by a dichroic beamsplitter 492. The dichroic beamsplitter 492 transmits a first component 422 and a second component 424, but reflects a third component 426. A lens 493 is positioned to receive the third component 426 and to transmit the third component 426 to be received by a mirror 494. The mirror 494 is positioned to receive the third component 426 from the lens 493 and to reflect the third component 426 to be received by a lens 495. The lens 495 is positioned to receive the third component 426 from the mirror 494 and to transmit the third component 426 to be received by the image assimilator 480.

A dichroic beamsplitter 496 is positioned to receive the first and second components 422, 424 from the dichroic beamsplitter 492 and is configured to reflect the first component 422 to be received by the image assimilator 430 and is configured to transmit the second component 424 to be received by the image assimilator 440. The light emitted from the image assimilators 430, 440 may be recombined using a variety of mechanisms known in the art, e.g., one or more Philips prism, modified Philips prism, plumbicon prism, x-prism, three-channel prism, recombining prism, and the like. For example, as shown in FIG. 4, the light emitted from image assimilators 430, 440 may be recombined using an x-prism.

Figure 3:
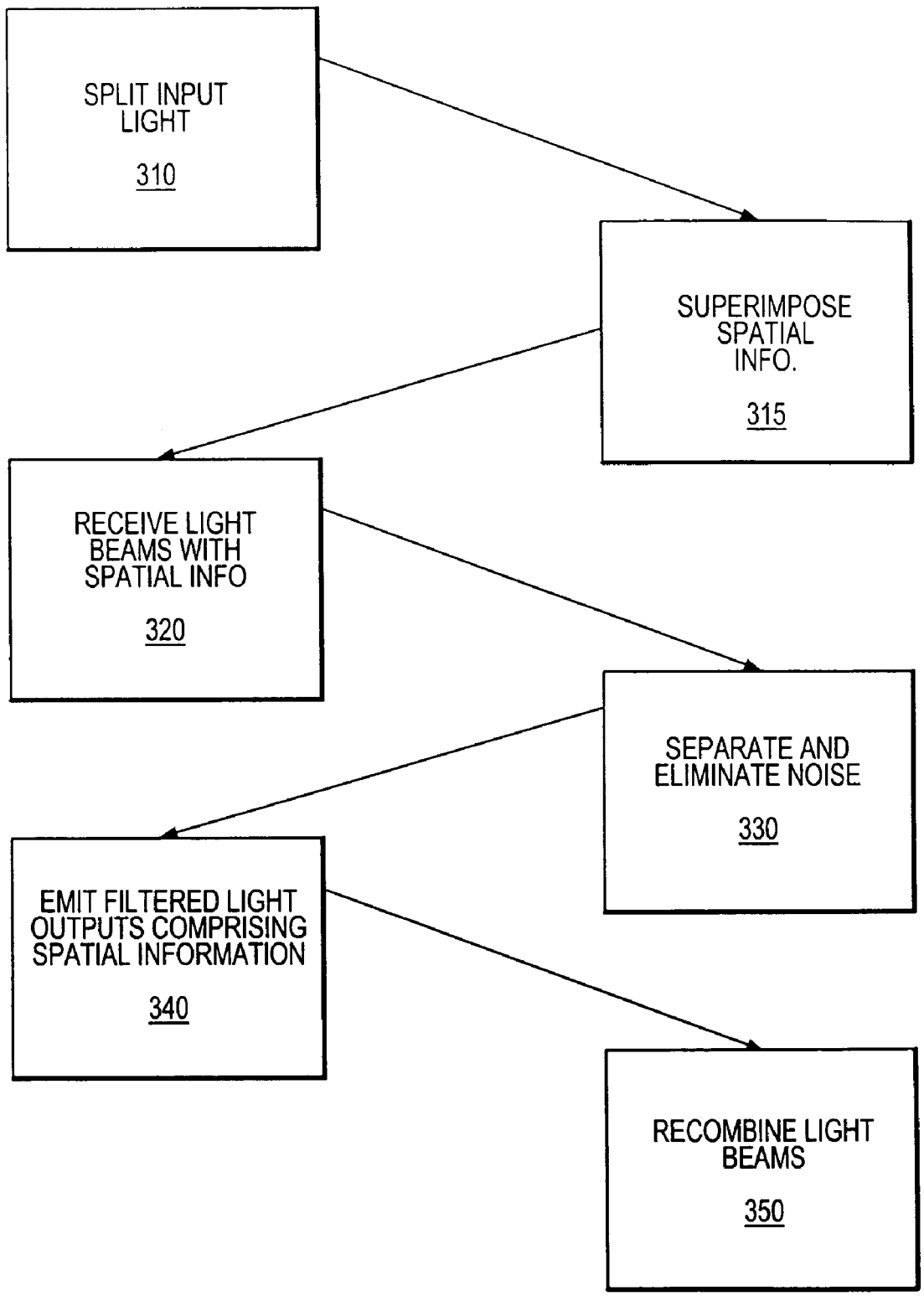
FIG. 3 is a flow chart illustrating an exemplary method in accordance with an exemplary embodiment of the present invention.

With reference to FIG. 3, in accordance with an exemplary embodiment of the present invention, a method for providing color management for a projection system is provided comprising the steps of receiving two or more input light beams having spatial information and noise directly from associated image assimilators (step 320), separating the noise from the spatial information in each of the light beams (step 330), and emitting filtered light outputs comprising the spatial information (step 340), whereby the output light beams have an improved contrast relative to the input light beams.

Accordingly, the use of closely-coupled analyzers positioned to receive light beams directly from associated image assimilators enables the color management system to effectively eliminate a substantial portion of noise imparted on the light beam by each of the image assimilators and to produce output light beams having superior contrast relative to the prior art. Moreover, it should be noted that the present invention may employ both polarization dependent elements and dichroic elements to split an input light into a plurality of color bands upon which spatial information may be superimposed by a corresponding plurality of microdisplays, the modified color bands being recombined to produce a high-contrast, full color projected image. One skilled in the art will appreciate that the color management system of the present invention may be adapted for use in multiple panel systems, such as four panel systems, three panel systems as well as the two panel systems primarily described herein.

Accordingly, the present invention utilizes both polarization dependent elements and dichroic elements to split (step 310) an input light into a plurality of color bands upon which spatial information may be superimposed (step 315) by a corresponding plurality of microdisplays, the modified color bands being filtered to remove noise from the spatial information (step 330) and thereby improve contrast, the high contrast light beams being thereafter recombined (step 350) to produce a fill color projected image.

Figure 5:
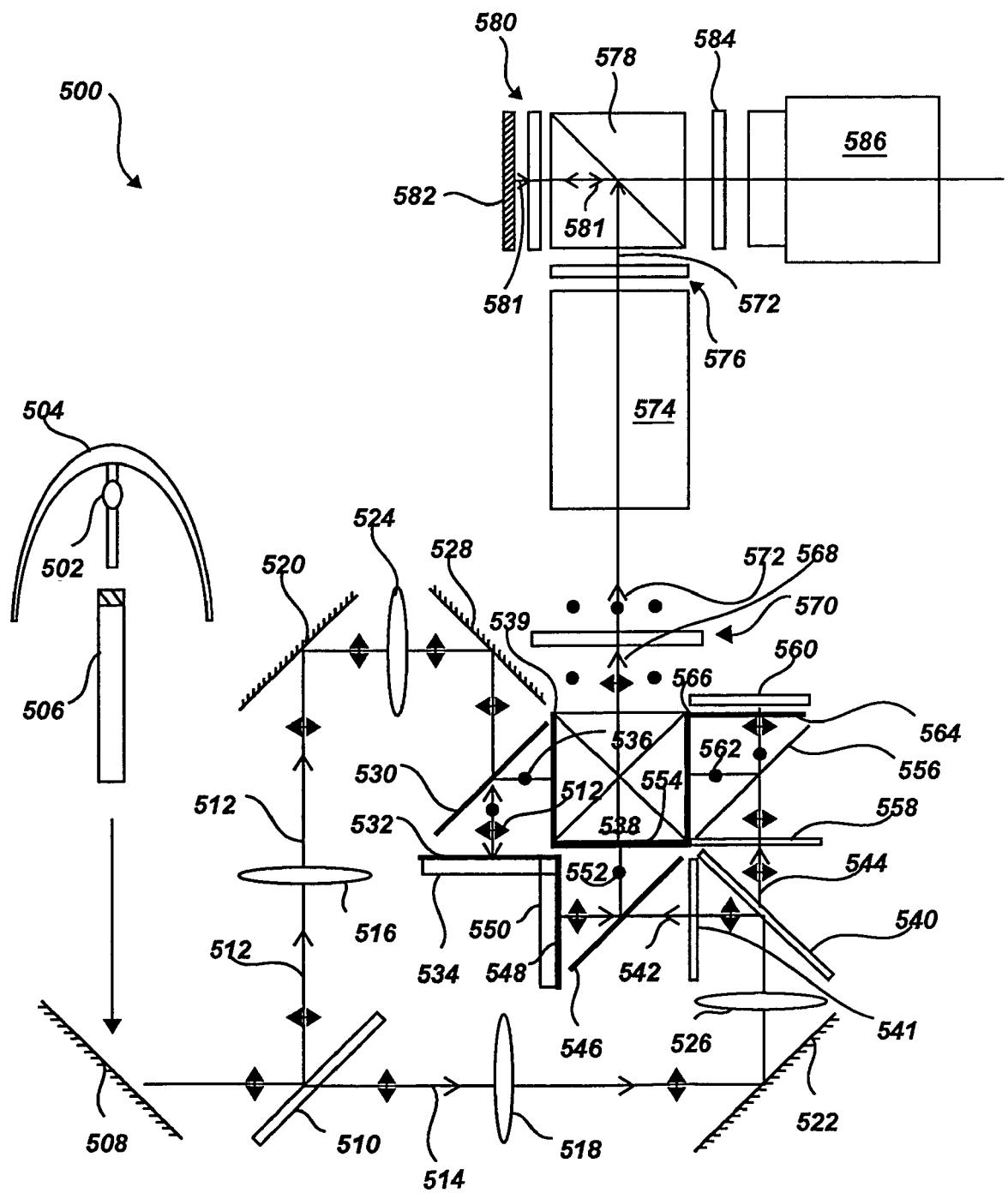
FIG. 5 illustrates a color management system in accordance with an exemplary embodiment of the present invention.

With reference, to FIG. 5, a color management system 500 includes a lamp 502 for producing white light, a reflector 504 for directing, reflecting and/or focusing the white light in a particular direction, and a light pipe 506 for receiving and propagating the white light. The reflector 504 may be made of a reflective material or have a reflective or dichroic coating. In one embodiment, the light pipe 506 is a polarization conversion light pipe (PCLP) manufactured by JDS Uniphase of San Jose, Calif. Light pipes are commonly used to improve the uniformity of the light produced by such non-uniform light sources, thereby creating a uniform light source for illumination optics in image or projection display devices. Light pipes are generally configured in one of two common forms: (1) as a hollow tunnel, in which a pipe has a highly reflective inner wall (e.g., has a highly reflective coating on its inner wall), or (2) as a solid member, in which a solid glass rod has an optically transparent medium. In form (2), the light pipe relies on total internal reflection (TIR) to contain the light within the solid member. The light pipe may also be (3) a clad light pipe. The clad light pipe is a light pipe that has a thin coating or layer of material (e.g., glass or plastic) that surrounds (except for the ends) the light pipe. The coating or layer has a lower index of refraction as compared to the light pipe.

Figure 6:
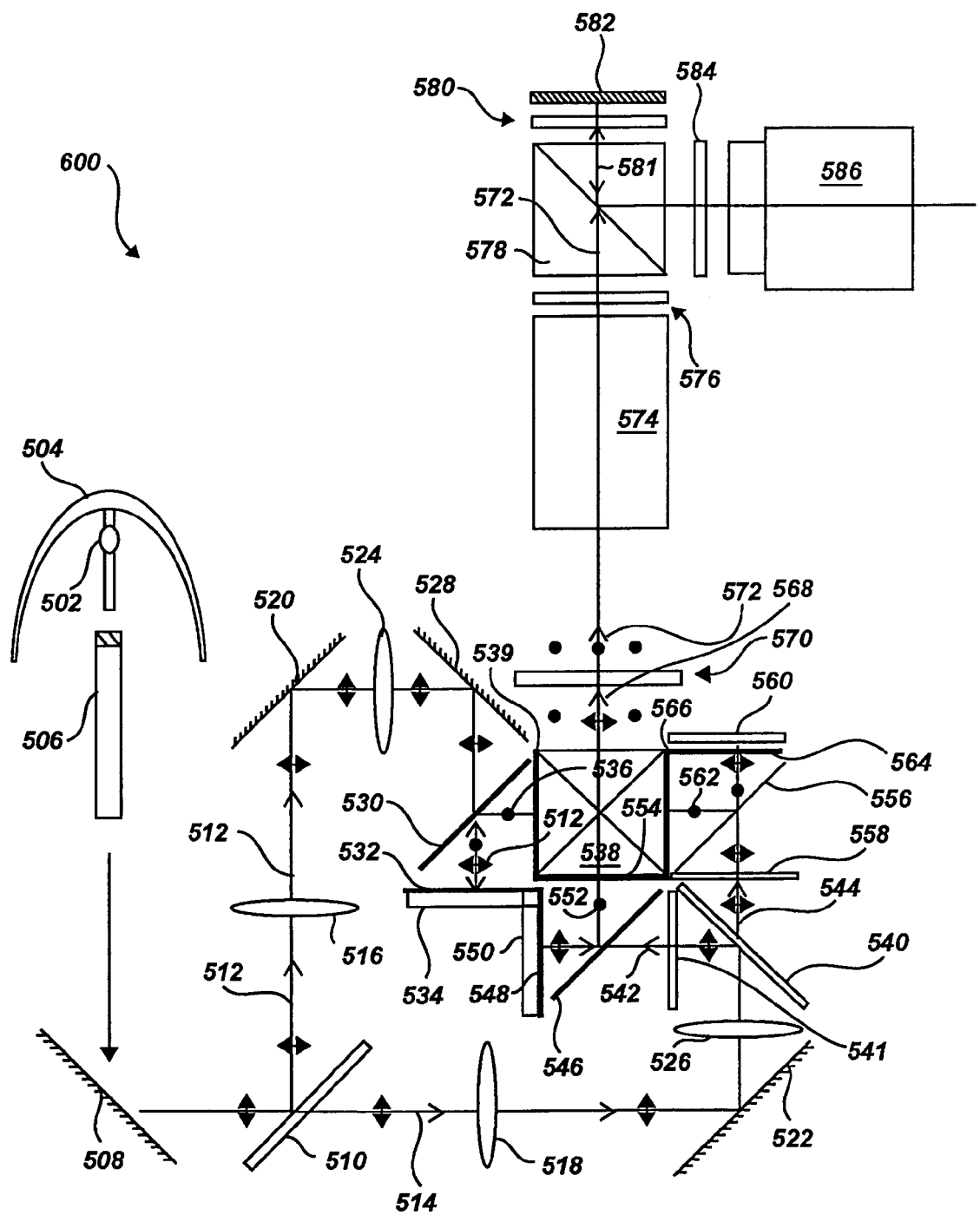
FIG. 6 illustrates a color management system in accordance with an exemplary embodiment of the present invention.

Referring to FIGS. 5 and 6, the double-sided arrows represent light having a p-polarization state and the dark circles or dots represent light having a s-polarization state. The light from the lamp 502 generally travels through the light pipe 506 and to a mirror 508, which directs or reflects the light toward a dichroic beamsplitter 510. The dichroic beamsplitter 510 separates a first component 512 (e.g., blue light) from a second component 514 (e.g., yellow light) based on polarization orientation or wavelength of the light. In one embodiment, the dichroic beamsplitter 510 reflects the first component 512 and transmits the second component 514. A lens 516 may be positioned to receive the first component 512 from the dichroic beamsplitter 510 and transmit the first component 512 to be received by a mirror 520. A lens 518 may be positioned to receive the second component 514 from the dichroic beamsplitter 510 and transmit the second component 514 to be received by a mirror 522. The mirror 520 may be used to reflect the first component 512 to be received by a lens 524 and the mirror 522 may be used to reflect the second component 514 to be received by a lens 526. A mirror 528 may be used to reflect the first component 512 to be received by a plate beamsplitter 530. The mirrors and lenses described herein may be optional depending on the configuration, geometry and requirements of the color management system 500 and the projector. Also, reference to the terms mirror and lens may include one or more mirrors and one or more lenses, respectively.

The plate beamsplitter 530 receives the first component 512 and transmits the first component 512 to a microdisplay panel 534. The microdisplay panel 534 imparts spatial information on the first component to produce a first modified component 536. Optionally, an optical retarder 532 (e.g., a trim retarder) may be positioned optically between the plate beamsplitter 530 and the microdisplay panel 534 and/or directly adjacent to the microdisplay panel 534. The optical retarder 532 is configured to substantially compensate for an optical retardance produced by the microdisplay panel 534. The plate beamsplitter 530 reflects the first modified component 536 to be received by a light combiner 538. Optionally, a filter 539 may be positioned adjacent to the light combiner 538 and may receive the first modified component 536 prior to receipt by the light combiner 538. The filter 539 may be used to remove light of a predetermined wavelength or band of wavelengths from, and/or to modify the polarization state of the first modified component 536.

A dichroic beamsplitter 540 receives the second component 514 from the lens 526. The dichroic beamsplitter 540 separates the second component 514 (e.g., yellow light) into a third component 542 (e.g., green light) and a fourth component 544 (e.g., red light) based on polarization orientation or wavelength of the light. In one embodiment, the dichroic beamsplitter 540 reflects the third component 542 and transmits the fourth component 544.

The plate beamsplitter 546 receives the third component 542 and transmits the third component 542 to a microdisplay panel 550. Optionally, a filter 541 may be positioned optically between the dichroic beamsplitter 540 and the plate beamsplitter 546 to remove any unwanted light (e.g., yellow light) present in the third component 542. The microdisplay panel 550 imparts spatial information on the third component to produce a third modified component 552. Optionally, an optical retarder 548 (e.g., trim retarder) may be positioned optically between the plate beamsplitter 546 and the microdisplay panel 550 and/or directly adjacent to the microdisplay panel 550. The optical retarder 548 is configured to substantially compensate for an optical retardence produced by the microdisplay panel 550. The plate beamsplitter 546 reflects the third modified component 552 to be received by the light combiner 538. Optionally, a filter 554 may be positioned adjacent to the light combiner 538 and may receive the third modified component 552 prior to receipt by the light combiner 538. The filter 554 may include a polarizer for cleaning up or modifying the polarization state of the third modified component 552 and a half-wave plate for rotating the polarization state of the third modified component 552 by approximately 90 degrees.

The plate beamsplitter 556 receives the fourth component 544 and transmits the fourth component 544 to a microdisplay panel 560. Optionally, a filter 558 may be positioned optically between the dichroic beamsplitter 540 and the plate beamsplitter 556 to remove any unwanted light (e.g., yellow light) present in the fourth component 544. The microdisplay panel 560 imparts spatial information on the fourth component to produce a fourth modified component 562. Optionally, an optical retarder 564 (e.g., trim retarder) may be positioned optically between the plate beamsplitter 556 and the microdisplay panel 560 and/or directly adjacent to the microdisplay panel 560. The optical retarder 564 is configured to substantially compensate for an optical retardence produced by the microdisplay panel 560. The plate beamsplitter 556 reflects the fourth modified component 562 to be received by the light combiner 538. Optionally, a filter 566 may be positioned adjacent to the light combiner 538 and may receive the fourth modified component 562 prior to receipt by the light combiner 538. The filter 566 may be used to remove light of a predetermined wavelength or band of wavelengths from, and/or to modify the polarization state of the fourth modified component 562.

The plate beamsplitters 530, 546, 556 can be a dichroic beamsplitter, a dichroic mirror, a dichroic prism, a polarizing beamsplitter, a wire grid polarizer, and/or an optical retarder.

The light combiner 538 is positioned to receive the first, third and fourth components 536, 552, 562 from the filters 539, 554, 566. The light combiner 538 is configured to substantially combine the first, third and fourth components 536, 552, 562 to produce a light output 568. In one embodiment, the light combiner 538 includes a polarizing beamsplitter. The light combiner 538 may include a dichroic beamsplitter or an x-prism (or an x-cube).

The color management system 500 may include a wavelength selective polarization rotator 570. In one embodiment, the polarization rotator 570 may be a Colorlink GM ColorSelect filter. The polarization rotator 570 is configured to rotate the polarization axis or orientation of one or more of the colors of the light output 568 to produce a substantially linearly polarized light beam 572. For example, in this embodiment, the polarization rotator 570 rotates the polarization axis of the green light 552 with respect to the red and blue light 562, 536.

The linearly polarized light beam 572 may travel through an imaging relay lens 574 for imaging pixel-by-pixel the red, green and blue microdisplay panels 534, 550, 560 onto a fourth microdisplay panel 582 and a pre-polarizer 576 for cleaning up or modifying the linearly polarized light beam 572, to a polarizing cube beamsplitter 578. The polarizing cube beamsplitter 578 directs the linearly polarized light beam 572 toward the microdisplay panel 582 such as a liquid crystal on silicon (LCOS) panel. The microdisplay panel 582 acts as an additional grayscale and contrast modulator. In one embodiment, the microdisplay panel 582 is similar to the microdisplay panels 534, 550, 560. The microdisplay panel 582 emits a modified light beam 581 that has an improved grayscale and contrast relative to the linearly polarized light beam 572. For example, the linearly polarized light beam 572 may have 256 grayscale levels and approximately a 400:1 contrast ratio while the modified light beam 581 may have 65,536 grayscale levels and approximately a 100,000:1 contrast ratio.

The color management system 500 may include a filter 580 (e.g., an optical retarder element, such as a half-wave retarder or a quarter-wave retarder). Where the filter 580 is an optical retarder element, the retarder element may be configured to compensate for the optical retardance of the microdisplay panel 582 and the depolarization introduced by the polarizing cube beamsplitter 578. Such filters may be selected to exhibit a specific optical retardance, for example, between about 15 nanometers and 350 nanometers of optical retardance, to substantially compensate for the optical retardance of the microdisplay panel 582 and the depolarization introduced by the polarizing cube beamsplitter 578. The polarizer 584 may be used to remove light of a predetermined wavelength or band of wavelengths from, and/or to modify the polarization state of the modified light beam 581. A projection lens 586 may be used to project the modified light beam 581 or image onto a screen.

FIG. 6 is a color management system 600 that is similar to the color management system 500 of FIG. 5. In FIG. 6, the polarizing cube beamsplitter 578 transmits the linearly polarized light beam 572 toward the microdisplay panel 582. The microdisplay panel 582 acts as an additional grayscale and contrast modulator. The microdisplay panel 582 emits a modified light beam 581 that has an improved grayscale and contrast relative to the linearly polarized light beam 572. The filter 580 may be selected to exhibit a specific optical retardance, for example, between about 15 nanometers and 350 nanometers of optical retardance, to substantially compensate for the optical retardance of the microdisplay panel 582 and the depolarization introduced by the polarizing cube beamsplitter 578. The polarizer 584 may be used to remove light of a predetermined wavelength or band of wavelengths from, and/or to modify the polarization state of the modified light beam 581.

The present invention has been described above with reference to various exemplary embodiments. However, those skilled in the art will recognize that changes and modifications may be made to the exemplary embodiments without departing from the scope of the present invention. For example, the various elements may be implemented in alternate ways, such as, for example, by providing other optical configurations or arrangements. These alternatives can be suitably selected depending upon the particular application or in consideration of any number of factors associated with the operation of the system. Moreover, these and other changes or modifications are intended to be included within the scope of the present invention, as recited in the following claims.

What is claimed is:

1. An image display device, comprising:
a first panel positioned to receive a first light beam and configured to modify the first light beam to emit a first modified light beam;
a first beamsplitter configured to reflect the first modified light beam;
a second panel positioned to receive a second light beam and configured to modify the second light beam to emit a second modified light beam;
a second beamsplitter configured to reflect the second modified light beam;
a third panel positioned to receive a third light beam and configured to modify the third light beam to emit a third modified light beam;
a third beamsplitter configured to reflect the third modified light beam;
a light combiner positioned to receive the first, second, and third modified light beams and configured to emit a combined light beam; and
a fourth panel positioned to receive the combined light beam and configured to emit a combined modified light beam.

2. The image display device of claim 1, further comprising a polarizing cube beamsplitter configured to receive the combined light beam and configured to direct the combined light beam toward the fourth panel.

3. The image display device of claim 2, further comprising a filter positioned between the fourth panel and the polarizing cube beamsplitter and configured to compensate for optical retardence introduced by the fourth panel and depolarization introduced by the polarizing cube beamsplitter.

4. The image display device of claim 3, wherein the filter is a hal-fwave retarder or a quarter-wave retarder.

5. The image display device of claim 1, wherein the combined modified light beam has an improved grayscale and contrast relative to the combined light beam.

6. The image display device of claim 1, further comprising a polarization rotator positioned to receive the combined light beam from the light combiner and configured to rotate the polarization orientation of one or more of the colors of the combined light beam.

7. The image display device of claim 1, further comprising an imaging relay lens positioned to receive the combined light beam and configured to image pixel-by-pixel the first, second and third panels onto the fourth panel.

8. The image display device of claim 1, further comprising a first optical retarder positioned adjacent to the first panel and configured to substantially compensate for a first optical retardence produced by the first panel.

9. The image display device of claim 1, further comprising a second optical retarder positioned adjacent to the second panel and configured to substantially compensate for a second optical retardence produced by the second panel.

10. The image display device of claim 1, further comprising a third optical retarder positioned adjacent to the third panel and configured to substantially compensate for a third optical retardence produced by the third panel.

11. The image display device of claim 1, wherein each of the first, second, and third beamsplitters is selected from a group consisting of a dichroic beamsplitter, a dichroic mirror, a dichroic prism, a plate beamsplitter, a polarizing beamsplitter, a wire grid polarizer, and an optical retarder.

* * * * *

UNITED STATES PATENT AND TRADEMARK OFFICE
CERTIFICATE OF CORRECTION

PATENT NO. : 7,347,561 B2
APPLICATION NO. : 11/053383
DATED : March 25, 2008
INVENTOR(S) : Pentico et al.

It is certified that error appears in the above-identified patent and that said Letters Patent is hereby corrected as shown below:

Col. 2, line 23-24, "beanmsplitters" should read --beamsplitters--

Col. 13, line 5, "a fill color" should read --a full color--

Signed and Sealed this

Twenty-ninth Day of July, 2008

JON W. DUDAS
*Director of the United States Patent and Trademark Office*